Oct. 24, 1961  D. C. LOOMANS  3,005,626
STEAM INJECTION HEATER EMPLOYING
A PLURALITY OF HEATING UNITS
Filed Jan. 20, 1958  2 Sheets-Sheet 1

INVENTOR.
DAVID C. LOOMANS
BY Warren F.B. Lindsley
ATTORNEY

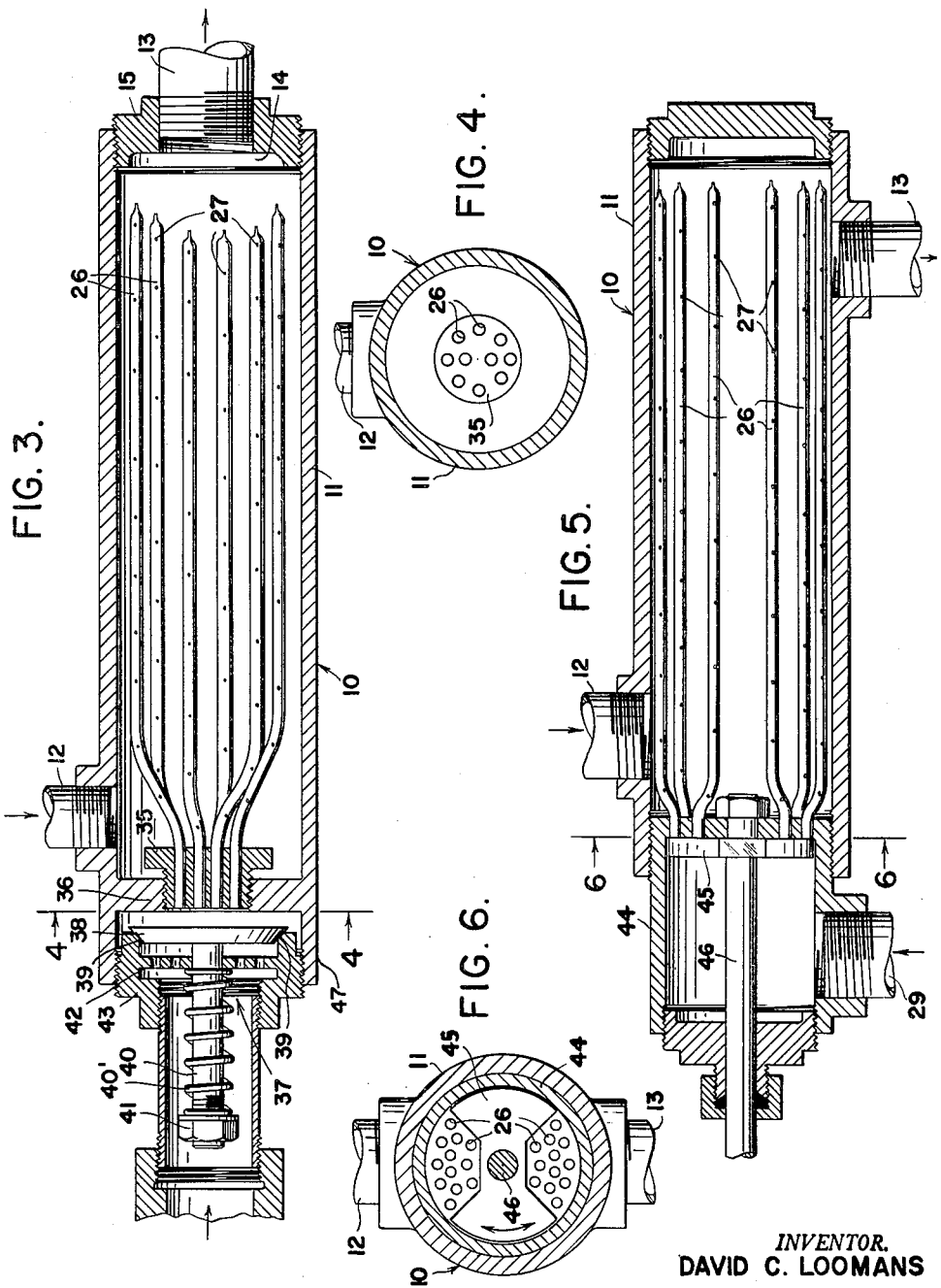

United States Patent Office 3,005,626
Patented Oct. 24, 1961

3,005,626
STEAM INJECTION HEATER EMPLOYING A PLURALITY OF HEATING UNITS
David C. Loomans, 251 S. Main St., West Bend, Wis.
Filed Jan. 20, 1958, Ser. No. 709,905
2 Claims. (Cl. 261—64)

This invention relates to heating systems and more particularly to substantially instantaneous steam injection water heaters.

Heretofore steam injection systems which directed live steam into water created objectionable hammering and pounding and in many cases uncontrollable turbulence during starting, running and stopping conditions. The hammering and turbulence was caused by large bubbles of steam forming in the water chamber. This usually occurred when large volumes of steam were forced into too small a volume of water and the water was unable to dissolve the steam fast enough. These large bubbles of steam moved along the length of the heater and in extreme cases into the hot water pipes.

Further, the known heaters had noise and control difficulties when starting and stopping. The collection of significant quantities of water in the steam injection apparatus and the steam control valve structure during idle periods made starting operations rough due to the fact that steam came into direct contact with cold water before reaching the steam injection apparatus, i.e. before the steam could be systematically injected into the cold water thereby causing uncontrolled conditions. When the known heaters utilizing automatic controls were stopped the automatic controls could not shut off the steam quickly enough thereby causing the steam to react against the closed chamber of water in the heater casing which water is cool in comparison to the temperature of steam consequently causing hammering. The water in the known heaters was not heated uniformly because the steam was not uniformly distributed throughout the heater structure.

Therefore, in accordance with the invention claimed, a new and improved substantially instantaneous steam injection water heater is provided comprising an elongated heater casing. The casing is provided with water inlet and outlet ports and a steam inlet port. A plurality of spaced apertured elongated steam injection tubes are longitudinally arranged within the heater casing. Means are provided for connecting the water inlet port to a source of water under pressure and the outlet port to a hot water load. A suitable valve means is arranged within the heater casing at the steam inlet port for connecting the steam inlet port with the steam injection tubes. The valve means upon predetermined actuation thereof connects the steam injection tubes to the steam line through the steam inlet port.

It is, therefore, one object of this invention to provide a new and improved substantially instantaneous steam injection water heater.

Another object of this invention is to provide a new and improved steam injection heater which may be satisfactorily used with manual or automatic controls without hammering, turbulence or any other such undesirable effects.

A further object of this invention is to provide a new and improved substantially instantaneous steam injection water heater which uniformly distributes the injected steam throughout the heater casing.

A still further object of this invention is to provide a new and improved substantially instantaneous steam injected water heater in which the steam is injected uniformly throughout the heater casing regardless of withdrawal loads on the heater without hammering or turbulence or any other such undesirable effects.

A still further object of this invention is to provide a new and improved substantially instantaneous steam injection water heater which may be started cold or shut down rapidly without hammering, turbulence or undesirable effects.

A still further object of this invention is to provide a new and improved steam injection heater which heats small, medium or large quantities of water without hammering, turbulence or any such undesirable effects.

A still further object of this invention is to provide a new and improved steam injection heater which heats water to any predetermined water temperature.

A still further object of this invention is to provide a new and improved substantially instantaneous steam injection water heater in which the pressures of the steam and water are controlled within predetermined limits.

Objects and advantages other than those above set forth will be apparent from the following description when read in connection with the accompanying drawings in which:

FIG. 3 is an elevational view partly in section of a modification of the instantaneous steam injection water heater illustrated in FIG. 1;

FIG. 4 is a cross section view through the water heater illustrated in FIG. 3 taken along the line 4—4;

FIG. 5 is an elevation view partly in section of a further modification of the instantaneous steam injection water heater illustrated in FIGS. 1 through 4; and FIG. 6 is a cross section view through the water heater illustrated in FIG. 5 taken along the line 5—5.

Figures 1, 2:
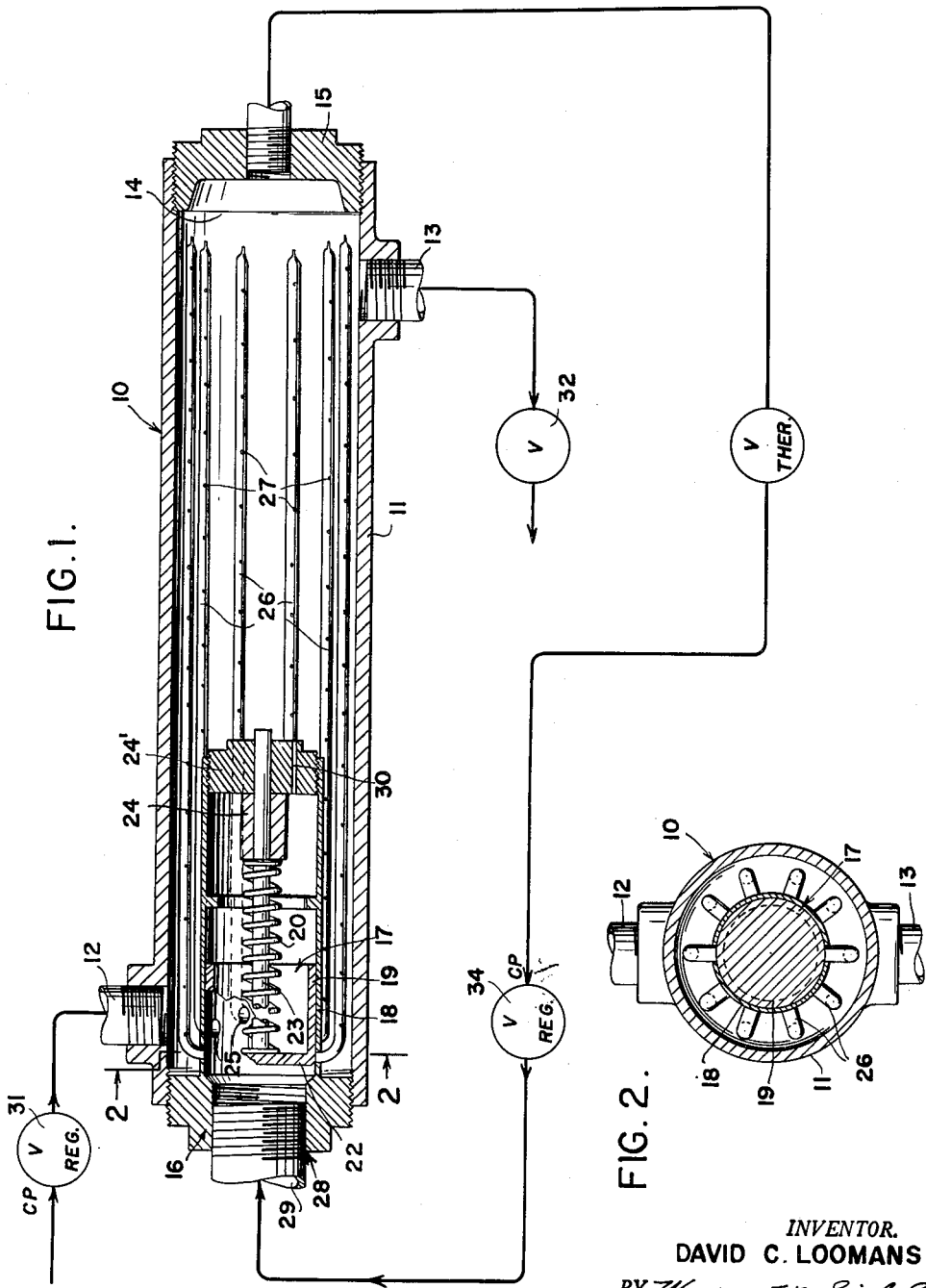
FIG. 1 is an elevational view partly in section of an instantaneous steam injection water heater embodying the invention and showing diagrammatically the system in which it is used.
FIG. 2 is a cross sectional view through the water heater of FIG. 1 taken along the line 2—2.

Referring to the drawings by characters of reference, FIG. 1 illustrates a substantially instantaneous steam injected water heater 10 utilizing the direct injection of live steam into water. As the water passes through the heating chamber the proper amount of live steam is injected into the water uniformly throughout the heating chamber, thus heating the water to the desired temperature instantly. The heater 10 comprises an elongated heater casing 11 which is provided with a water inlet 12 and a water outlet 13 arranged at opposite ends thereof. The outlet end 14 of the heater casing 11 is provided with a plug 15 threadedly connected thereto. Plug 15 has an opening extending thereto for the insertion into casing 11 of a suitable thermostat (not shown). The other end of casing 11 is provided with steam injection apparatus 16 threadedly connected thereto. The steam injection apparatus comprises a pressure sensitive valve 17 having a cylindrical valve body 18 and a valve element 19 movably arranged within said valve body 18 and biased to closed position by means of a helical spring 20. The valve element is in the shape of a piston 22 having a piston rod 23 secured thereto and slidably movable through one end of the cylindrical valve body 18. One end of spring 20 which is mounted around piston rod 23 rests against the inside or downstream side of piston 22 and the other end rests upon the surface of a bushing 24 which rests upon the surface of a plug 24'. Plug 24' closes the downstream end of valve body 18.

The walls of the cylindrical valve body 18 are provided with a plurality of spaced apertures 25 into each of which is fixedly secured an elongated steam injection tube 26. These tubes are each provided with a plurality of apertures or nozzles 27 spaced at random therealong. Tubes 26 are arranged to extend longitudinally of casing 11 and if so desired may be equally spaced from each other. As shown in FIGS. 1 and 2 the tubes extend out from the cylindrical valve body 18 at various points along its longitudinal axis and as valve element 19 is moved axially along the inside of valve body 18 the steam injection tubes are sequentially passed by piston 22. The upstream end 28 of the steam injection apparatus 16 is provided with a steam inlet port 29 which is connected to a suitable source of steam under pressure. Steam under pressure at all times during operation of the steam injection heater 10 is applied to the upstream side of piston 22. Plug 24' closing the downstream side of the valve body 18 of the steam injection apparatus 16 is provided with a water port 30 which provides a passage way for water from within casing 11 to flow inside of valve body 18 and behind and downstream of piston 22. Port 30 by its small cross sectional area limits the speed of movement of piston 22 and serves as a means for regulating the speed of operation of the pressure sensitive valve.

As shown in FIG. 1 the water inlet port 12 is connected through a suitable water regulating valve 31 to a source of water under pressure such as the known water mains. Valve 31 may be, if so desired, set for operation at 40 lbs. per square inch with the water main pressure usually being 60 lbs. per square inch. The water outlet port 13 is connected through a suitable cut off valve 32 to the hot water load (not shown). A steam regulating valve 34 furnishes the steam under pressure from a suitable source (not shown) to the steam inlet port 29 and is usually regulated by a thermostatic assembly inserted into plug 15 of casing 11.

When valve 32 is opened to draw hot water from heater 10 the pressure in casing 11 drops to a point at which the steam pressure from the steam line supplied through steam inlet port 29 operating on the upstream side of piston 22 is greater than the combination spring pressure acting on the downstream side of piston 22 and water pressure in casing 11. This differential of pressure causes piston 22 of valve element 19 to move from left to right as shown in FIG. 1 and to thereby expose sequentially the open ends of the steam injection tubes 26 which extend into the apertures in the wall of the valve body 18 to steam under pressure. Steam passes through the injection tubes 26 and is expelled out of apertures or nozzles 27 into the water in casing 11 and substantially instantaneously heating it to the desired temperature.

When cut off valve 32 is closed, the steam acts directly against the closed chamber of water in the heater casing. Therefore, a sharp increase of pressure inside the heater casing due to the combined effects of steam pressure and the water main pressure occurs which makes the sum of the spring pressure plus the water pressure on the piston-back or downstream side of the piston larger than the pressure applied to the face or upstream side of the piston by the steam. This causes a right to left movement of the piston as shown in FIG. 1 performing the shut off of the steam.

In all cases of starting and stopping, the speed by which this pressure activated piston type valve acts is controlled by the restricted passage of water through port 30, thereby damping the action of piston 22 to any desired limits.

By arranging a plurality of tubes in casing 11 to extend longitudinally thereof the steam can be directed to all areas of the heater casing interior substantially instantaneously. Heretofore the water was heated in one area only causing pounding, turbulence and undesirable internal stresses. Regardless of the open position of the piston of valve element 18 the steam is directed to all points along its longitudinal axis because if only one injection tube is open to steam pressure the steam is injected from all of the apertures in that tube substantially simultaneously. In view of the fact that all of the tubes are provided with apertures along its longitudinal axis the steam is effective instantly along the full length of the heater for heating water.

A continuous supply of hot water at any load condition is possible with this heater. At high hot water loads the pressure drops in casing 11 to a value such that the valve element 19 is actuated to the right exposing some if not all of the steam injection tube openings to steam under pressure. At medium or reduced loads only part of the steam injection tubes are exposed to steam pressure and less steam is admitted to the water in the heater casing. At low loads only a few steam injection tubes are exposed to steam under pressure. Under all conditions of hot water load the steam is injected into the heater casing at a plurality of points along the longitudinal axis of the casing.

FIGS. 3 and 4 illustrate a modification of the instantaneous steam injection heater illustrated in FIGS. 1 and 2 wherein like parts are indicated by similar reference characters. In FIG. 3 the heater casing 11 has its water outlet port 13 arranged in plug 15. The spaced elongated apertured steam injection tubes 26 are fixedly secured at their steam receiving ends to a plug 35 which is threadedly attached to an apertured collar 36 arranged in casing 11 transversely to its longitudinal axis. The pressure sensitive valve 37 comprises a valve element 38 which cooperates with a valve seat 39 to block the entrance of steam under pressure through the valve and into the steam injection tubes. As shown in FIG. 3 helical spring 40' mounted around valve stem 40 biases the valve to valve closed position. Spring 40' is arranged between nut 41 arranged on the free end of valve stem 40 and an apertured plate 42 arranged within plug 43. Plug 43 is used to threadedly attach the valve structure to the steam entrance end of the heater structure.

When cut off valve 32 is closed water within heater casing 11 communicates with the inside of valve cylinder 47 to the right of valve element 38, as shown in FIG. 3, by flowing through apertures 27 and tubes 26 thereby equalizing the pressure within casing 11 and valve cylinder 47. Water pressure within valve cylinder 47 in combination with the effects of spring 40' closes and retains closed valve 38 until water is withdrawn from the heater structure.

As water is withdrawn from the heater casing the water pressure on valve element 38 to hold it closed against its valve seat 39 is reduced. The reduction of water pressure occurs by the withdrawal of water through pipe 13 from casing 11 and from valve cylinder 47 through tubes 26 and apertures 27. This withdrawal of water continues until a point is reached where the steam pressure on the opposite or steam entrance side of the valve element 38 exceeds the combined water pressure in cylinder 47 and the pressure of spring 40'. Valve element 38 is then biased to the right as shown in FIG. 3 to provide a passage way for steam to flow from its source through the valve structure to the steam injection tubes 26. In this modification all of the tubes receive steam substantially simultaneously and inject the steam into the water at a plurality of points along their longitudinal axes. FIG. 4 illustrates a particular arrangement of the tubes throughout the heater casing, however, any other arrangement may be used and is intended to be covered by the scope of the appended claims. The cut off of valve 32 connected to the structure illustrated in FIGS. 3 and 4 to shut the heater off causes the pressure to increase in the heating casing in the same manner as it does in the structure illustrated in FIGS. 1 and 2 causing the valve element 38 to move from right to left to valve closed position.

FIGS. 5 and 6 illustrate a further modification of this invention wherein like parts of FIGS. 1, 2, 3 and 4 are given the same reference characters. The steam injection tubes' steam receiving ends are fixedly attached in the apertures formed in the end of a cylindrical valve casing 44 which is threadedly arranged in the steam receiving end of the heater casing 11. Casing 44 forms a steam housing for a rotatably mounted valve element 45. Valve element 45 is provided with a valve stem 46 which is arranged for rotation by suitable means (not shown) which may be attached to the valve stem outside of the valve casing 44. Casing 44 is further provided with the steam inlet port 29. In the modification illustrated in FIGS. 5 and 6 tubes 26 are arranged to extend longitudinally through the heater casing with their steam injection end being controlled by the butterfly shaped valve element 45. In one position the valve element closes or blocks the flow of steam from casing 44 to all of the steam injection tubes 26. As valve stem 46 is rotated the steam injection tubes 26 are sequentially opened to steam under pressure and the water is heated in the manner heretofore describd. To shut the heater off valve stem 46 is rotated further to block the flow of steam into the steam injection tubes 26.

Thus, in accordance with the invention claimed a new and improved substantially instantaneous steam injected water heater is provided which may be of any size and shape and still embody the novel principles of the invention. When hot water is drawing from the heater the valve means may be actuated to energize the steam injection tubes usually sequentially a few at a time. When all load is removed from the heater the water pressure rises to the pressure of the water supply main. In the automatically operated valve means the build-up of water pressure in the heater activates the pressure sensitive valve to close the valve and block the steam passage into the steam injection tubes.

As readily noted, the novel structure disclosed herein utilizes a plurality of small steam insertion or injection tubes each of which comprises a small heater unit. Together these small units comprise the new and improved heater structure claimed herein. The valve means activates the steam injection tubes usually a few at a time thereby providing reduced operation of the heater structure on small hot water loads. The pressure sensitive valve means accomplishes a fast shut down and a gradual start without pounding in the heater, water surges or undue build-up of internal pressures in the heater structure. The heater structure provides a damping action which further limits the fluctuations of the pressure sensitive valve means.

Each of the figures of the drawings further illustrate that the valve means during shut down completely isolates the steam under pressure from the water chamber. Any steam in the valve means on the upstream side of the movable valve element which might condense during heater shut down is drained back to the steam line and does not collect in the heater to impede a smooth start during a heater steam injection operation.

The disclosed heater is arranged for manual or automatic control and can heat, if desired, large quantities of hot water continuously as the water passes through the heater.

Although but a few embodiments of the present invention have been illustrated and described, it will be apparent to those skilled in the art that various changes and modifications may be made herein without departing from the spirit of the invention or from the scope of the appended claims.

It is claimed and desired to secure by Letters Patent:

1. A steam injection water heater comprising in combination an elongated heater casing, said casing being provided with water inlet and outlet ports and a steam inlet port, a plurality of spaced elongated steam injection tubes longitudinally arranged within said heater casing to extend along substantially its full length, said tubes being provided with a plurality of spaced apertures extending substantially along their full length, means for connecting said water inlet port to a source of water under pressure, means for connecting said outlet port to a hot water load, valve means arranged within said heater casing at said steam inlet port for connecting said injection tubes to said steam inlet port, said valve means comprising a cylinder arranged within said casing and connected at one end to said steam inlet port and at the other end through a water port to said casing interior and a valve element arranged within said cylinder and biased to close said steam inlet port, said cylinder being provided with a plurality of spaced apertures, means for connecting one end of each of said injection tubes to a different aperture in said cylinder, said valve means upon predetermined reduction of water pressure in said casing being actuated in a predetermined direction to connect said injection tubes to said steam inlet port, said valve means upon movement in said predetermined direction forcing water out of said cylinder through said water port, said water port serving as a damping means for controlling valve means fluctuations.

2. A steam injection water heater comprising in combination an elongated heater casing, said casing being provided with water inlet and outlet ports and a steam inlet port, a plurality of spaced elongated steam injection tubes longitudinally arranged within said heater casing to extend along substantially its full length, said tubes being provided with a plurality of spaced apertures extending substantially along their full length, means for connecting said water inlet port to a source of water under pressure, means for connecting said outlet port to a hot water load, pressure sensitive valve means arranged within said heater casing at said steam inlet port for sequentially connecting said injection tubes to said steam inlet port, said valve means comprising a cylinder arranged within said casing and connected at one end to said steam inlet port and at the other end through a water port to said casing interior and a valve element arranged within said cylinder and biased to close said steam inlet port, said cylinder being provided with a plurality of spaced apertures, means for connecting one end of each of said injection tubes to a different aperture in said cylinder, said valve means upon predetermined reduction of water pressure in said casing being actuated in a predetermined direction to sequentially connect said injection tubes to said steam inlet port, said valve means upon movement in said predetermined direction forcing water out of said cylinder through said water port serving as a damping means for controlling valve means fluctuation.

References Cited in the file of this patent

UNITED STATES PATENTS

| | | |
|---|---|---|
| 662,304 | Reenstierna | Nov. 20, 1900 |
| 935,015 | Guimont | Sept. 28, 1909 |
| 1,933,611 | White et al. | Nov. 7, 1933 |
| 2,243,144 | Auckland | May 27, 1941 |
| 2,297,768 | Hutchings | Oct. 6, 1942 |
| 2,611,595 | Streed | Sept. 23, 1952 |
| 2,822,157 | Porter | Feb. 4, 1958 |